United States Patent [19]

O'Connor

[11] Patent Number: 4,728,801

[45] Date of Patent: Mar. 1, 1988

[54] LIGHT SCATTERING SMOKE DETECTOR HAVING CONICAL AND CONCAVE SURFACES

[75] Inventor: Richard K. O'Connor, London, England

[73] Assignee: Thorn EMI Protech Limited, Twickenham, England

[21] Appl. No.: 860,567

[22] Filed: May 7, 1986

[51] Int. Cl.[4] .............................................. G01N 15/06

[52] U.S. Cl. ...................................... 250/573; 340/630

[58] Field of Search ................ 250/573, 574; 340/630; 356/438, 439

[56] References Cited

U.S. PATENT DOCUMENTS

| | | | |
|---|---|---|---|
| 4,099,178 | 7/1978 | Ranney et al. | 340/630 |
| 4,216,377 | 8/1980 | Hasegawa et al. | 250/574 |
| 4,300,133 | 11/1981 | Solomon | 250/574 |
| 4,596,465 | 6/1986 | Nagashima | 250/574 |

*Primary Examiner*—David C. Nelms

*Assistant Examiner*—Stephone B. Allen

*Attorney, Agent, or Firm*—Fleit, Jacobson, Cohn & Price

[57] ABSTRACT

Light-scatter smoke detector, depending from the ceiling of a room, has a base unit with a battery to power an infra-red light source and infra-red light sensor, both of which are located in an upper element. A lower element has a surface corresponding to the exterior of a cone, and forming the base of a chamber. A surface makes, with a frusto-conical surface of the upper element, an annular wedge-shaped recess to chamber, this recess facing both source and sensor. The surfaces have a matt-black coating to promote energy absorption, so that the recess inhibits any light entering it from ever re-emerging. The stream of air flowing through the detector is monitored in the central chamber for the presence of smoke particles, by the sensor watching for light which originated from the source being scattered by smoke particles in the chamber and arriving at the sensor.

6 Claims, 2 Drawing Figures

LIGHT SCATTERING SMOKE DETECTOR HAVING CONICAL AND CONCAVE SURFACES

FIELD OF INVENTION

The present invention relates to a light scattering smoke detector of the type which monitors for the scattering of light by smoke in a chamber of the detector.

SUMMARY OF THE INVENTION

The present invention provides a light-scatter smoke detector comprising:

a first member having a generally conical and concave surface to define a recess;

a second member having a generally conical surface;

the two members being positioned such that the recess of the first member and the surface of the second member form a chamber therebetween;

a light source positioned to output light towards a region of the chamber corresponding to an acute angle defined by and between the surface of the first member and the surface of the second member;

a light sensor to detect light scattered by smoke particles within the chamber, the light sensor being positioned away from the direct path of light output from the light source.

Preferably also the light source faces a region of the chamber in which surfaces of the first and second members define an acute angle therebetween.

Thus, in the invention, the chamber of the detector has a region which deters "incidental" light (i.e. that light not produced by scattering of smoke in the chamber) from reaching the light sensor of the detector; the "incidental" light might originate from the light source of the detector or might be ambient light from outside the detector. This region of the chamber reduces the possibility of "incidental" light reaching the sensor by providing an arrangement of surfaces which cause an increase in the number of reflections occurring to light passing to this region; as there is some absorption of energy upon each reflection of a light beam, the increase in the number of reflections reduces the possibility of a light beam ever emerging from that region of the chamber. In order to maximize the effect on the light originating from the source, one such region is positioned to be opposite and facing the light source; also a region of the chamber can be positioned opposite and facing the light sensor in order to minimise the amount of "incidental" light which is reflected into the sensor.

Preferably such a region has one or more surfaces with a high coefficient for light-absorption (e.g. by having a black coating) in order to further reduce the possibility of a beam of "incidental" light emerging from that region.

Advantageously, the two conical surfaces are positioned to define, at the region of the chamber facing the light source (and advantageously also the light sensor), an acute angle of less than 60°, preferably less than 45°. In this way, the number of reflections caused by a region is further increased.

Preferably the light source is positioned such that the path of its light output is directed not to intersect with a symmetrical axis of at least one of the generally conical surfaces of the two members. This provides an increase in the number of reflections experienced by a light beam originating from the light source, thereby further reducing the possibility of it emerging from the region of the chamber and then reaching the light sensor. Additionally or alternatively the light sensor is positioned such that the path of light input to it is not directed to intersect with a symmetrical axis of at least one of the generally conical surfaces, in order to further increase the number of reflections before any light can reach it.

Preferably, the spacing between the two members provides access for the air to flow through the detector.

BRIEF DESCRIPTION OF THE DRAWINGS

In order that the invention may more readily be understood, a description is now given, by way of example only, reference being made to the accompanying drawings, in which.

DESCRIPTION OF THE PREFERRED EMBODIMENT

Figure 1:
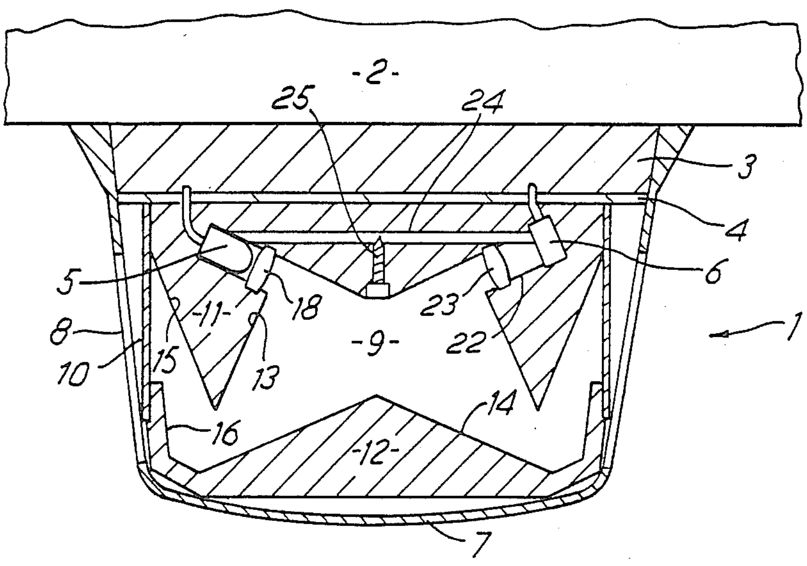
FIG. 1 is a cross-sectional view of a smoke detector embodying the present invention.

In FIG. 1, a cylindrical light-scatter smoke detector 1 depends from the ceiling 2 of a room. Detector 1 has a base unit 3 secured to the ceiling 2 and containing a dry-cell battery (not shown) to power the electrical circuitry on a printed circuit board 4 which includes an infra-red light source 5 and an infra-red light sensor 6. The detector 1 has an outer casing 7 which is suitably mounted on base unit 3 by a snap-fit connection (not shown); casing 7 has an annular grill 8 (formed of a plurality of vertical slots) extending around its lateral periphery which allows the passage of smoke into and out of the interior of the detector. Before air and smoke can reach a chamber 9 positioned at the center of detector 1, the smoke and air must pass through an annular wire mesh 10 which accordingly prevents the ingress of insects and objects of comparable (and larger) size. The stream of air flowing through detector 1 is monitored in the central chamber 9 for the presence of smoke particles, by sensor 6 watching for light which originated from source 5 being scattered by smoke particles in chamber 9 and arriving at sensor 6.

The chamber 9 is defined by two elements 11 and 12. Upper element 11 houses light source 5 and sensor 6, and has an inner frusto-conical surface 13 which forms the lateral sides of chamber 9. Lower element 12 has a surface 14 corresponding to the exterior of a cone, and this surface 14 forms the base of chamber 9. Surfaces 13 and 14 make, between themselves, an annular wedge-shaped recess to chamber 9, this recess facing both source 5 and sensor 6. Surfaces 13 and 14 have a shiney-black or matt-black coating to promote energy absorption of any light which hits them. The arrangement of surfaces 13 and 14 of elements 11 and 12 forms a region of chamber 9 which inhibits any light entering it from ever re-emerging; this is achieved by ensuring that the number of reflections is increased, together with the amount of energy absorbed per reflection.

The lateral exterior 15 of element 11 and the peripheral rim 16 of element 12 define between them the passageway connecting chamber 9 with the exterior via mesh 10 and grille 8.

Figure 2:
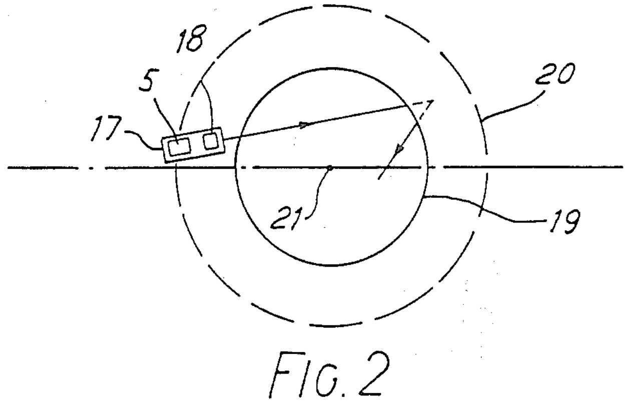
FIG. 2 is a schematic plan view of part of the detector of FIG. 1.

Light source 5 is located within an alcove 17 of element 11, at the end of which alcove is an optical lens system 18 to direct light into chamber 9 towards surface 13. The alcove 17 and lens system 18 are positioned such that the light beam output is directed into chamber 9 along a path which does not intersect with the symmetry axis of the cone defined by surface 13 (as shown schematically in FIG. 2 wherein surface 13 has an upper edge 19, a lower edge 20 and a central axis corresponding to a vertical line passing through point 21). In this way, there is a further increase in the number of reflections experienced by a beam from source 5. Likewise alcove 22 and lens system 23 for sensor 6 are positioned so that the path for light input to sensor 6 does not intersect with the symmetry axis of the cone formed by surface 13. Clearly the light path from source 5 (and/or the light path to sensor 6) can instead be directed towards surface 14 of the wedged recess, and provision can be made to ensure the path does not intersect with a symmetry axis of the cone formed by surface 14.

In this design of detector, the only part of chamber 9 prone to the settling of dust is surface 14 which itself forms part of the recess which inhibits emergence of light. Thus this detector is not significantly susceptible to light scattering caused by accumulation of dust.

Detector 1 has an optical bleed channel 24 for use in situations when a voltage measurement related to smoke density is required. The light from source 5 is channelled to sensor 6 via an adjustement screw 25 so that component performance can be monitored. Any change in emission strength or detection sensitivity will affect the bleed signal amplitude. Hence the bleed signal checks any component drift over long time periods.

By measuring sensor voltage output and requiring its value to be between two set levels, this method can also be used as a fail-safe facility. Failure of either emitter or detector will cause the bleed signal to fall below the lower set level.

In a modification to the detector 1, the gradients of the surfaces 13 and 14 are changed in order to produce a smaller angle defined therebetween i.e. to significently less than 45°, for example 25°. In this way the number of reflections produced by the recess is increased, thereby further reducing the possibility of light energy from that recess.

The detector 1 provides a construction which allows easy penetration of smoke into chamber 9 and has aerodynamic symmetry to permit equal smoke access in all directions. This construction allows sensitive monitoring of the air stream reaching chamber 9, and minimizes the possibility of erroneous triggering of the alarm, caused by "incidental" light either directly from the source or from the external surroundings. Moreover the detector 1 has a simple construction having few separate parts which can be quickly and easily assembled. This simple design minimizes the effect of dust collection within the detector and is easy to clean since there are no complex surfaces which trap dust.

In detector 1, a wedge-shaped recess is used to inhibit the re-emergence of light which enters it, this being achieved by promoting the number of reflections and the amount of energy absorbed in each reflection. Such a wedge-shaped recess may also be used in applications, other than related to smoke detectors, requiring a region which does not reflect or produce significant amounts of light.

I claim:

1. A light-scatter smoke detector comprising:

a first member having a generally conical and concave
surface to define a recess;

a second member having a generally conical surface; the two members being positioned such that the recess of the first member and the surface of the second member form a chamber therebetween;

a light source positioned to output light towards a region of the chamber corresponding to an acute angle defined by and between the surface of the first member and the surface of the second member such that, when not scattered, the light beam from the light source is first incident on one of said surfaces defining the acute angle, to cause reflection directly onto the other said surface;

a light sensor to detect light scattered by smoke particles within the chamber, the light sensor being positioned away from the direct path of light output from the light source prior to the first incidence with the chamber.

2. A detector according to claim 1, wherein the light sensor faces a region of the chamber in which surfaces of the first and second members define an acute angle therebetween.

3. A detector according to claim 1, wherein the actue angle defined between the members is 45° or less.

4. A detector according to claim 1, wherein the light source is positioned such that the path of its light output is directed not to intersect with a symmetrical axis of at least one of the generally conical surfaces of the two members.

5. A detector according to claim 1, wherein the light sensor is positioned such that the path of input to it is directed not to intersect with a symmetrical axis of at least one of the generally conical surfaces of the two members.

6. A detector according to claim 1, wherein the spacing between the two members provides access for the air to flow through the detector.

* * * * *